Nov. 15, 1960  W. A. SHEPHERD, JR  2,960,133
HAMMER BUTT PLUG
Filed Aug. 18, 1958

*INVENTOR.*
WARREN A. SHEPHERD, JR.
BY
*Lindsey and Preitzman*
ATTORNEYS

United States Patent Office 2,960,133
Patented Nov. 15, 1960

2,960,133

HAMMER BUTT PLUG

Warren A. Shepherd, Jr., Scotch Plains, N.J., assignor to The Stanley Works, New Britain, Conn., a corporation of Connecticut Filed Aug. 18, 1958, Ser. No. 755,518

2 Claims. (Cl. 145—61)

This invention generally relates to hammers and the like having resilient grips and is more specifically directed to plugs for handle grip butt ends.

It is not at all uncommon for bricklayers to use the butt end of the resilient hammer grip to tap bricks and the like into alignment in the mortar. This tapping deforms and damages the grip so as to lessen the utility of the hammer as well as the comfort of the grip.

It is therefore an object of the present invention to provide a novel handle grip arrangement which protects the resilient handle grip butt end from damage while providing an additional hammer work surface having a harder striking face than that provided by the grip material.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
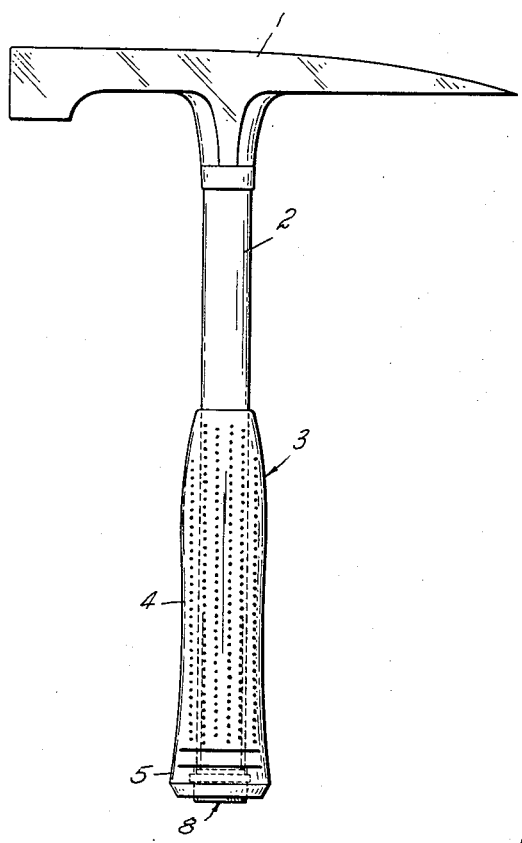
Fig. 1 is a side elevation of a brick hammer incorporating a preferred embodiment of the invention.

Referring now to the drawings, it is seen that the invention is applied to a brick hammer having a head 1 secured to a handle 2 in a conventional manner. Handle 2 is made of steel tubing having an oval cross section in the preferred embodiment (see Fig. 4) and has a resilient grip 3 secured thereon. Handle 2 is provided with cap 2a to facilitate insertion of handle 2 into grip 3. Grip 3 can be made of resilient neoprene rubber to absorb hammer shock and is provided with a hollow handle portion 4 whose internal shape generally conforms to handle 2. Butt portion 5 of grip 3 extends beyond the end of handle 2 and is provided with a generally circular opening 6 of diameter greater than the cross section dimensions of shank 2 and an internal radially directed or annular groove 7 adjacent the end of shank 2.

Figure 2:
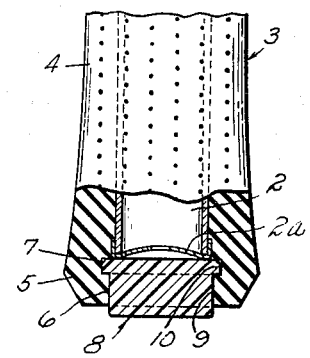
Fig. 2 is a fragmentary cross section of one embodiment of this invention.
Figure 4:
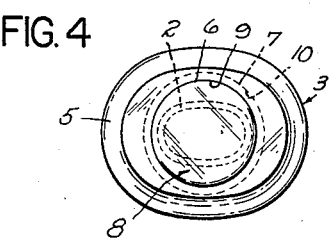
Fig. 4 is an end view of the handle shown in Fig. 2.

Referring now to Figs. 1, 2 and 4, it is seen that butt plug 8 has a generally cylindrical body portion 9 and an annular abutment or flange 10, the cylindrical portion 9 generally conforming in diameter to opening 6, and abutment 10 generally conforming in shape to radially directed groove 7. Butt plug 8 is made of a tough plastic capable of withstanding impact shock without fracture.

Because butt portion 5 of grip 3 is made of a resilient material, plug 8 can be forced into hole 6 to a position in which abutment 10 engages groove 7 to lock plug 8 into position in grip 3 adjacent the end of shank 2. When so inserted, cylindrical portion 6 of plug 8 extends slightly beyond the end of grip portion 5 and thus provides a tough work surface which will protect butt portion 5 of grip 3 from damage while providing an additional work surface on the hammer. It is noted that the inner face of plug 8 is adjacent cap 2a on the end of handle 2 and receives support therefrom when a force is applied to the outer face of plug 8. For example, it is customary for masons to use the handle butt end of the brick hammer to tap bricks into place in the mortar after they have been shaped by contact with the brick hammer head 1. When using a hammer having a grip incorporating the instant invention, such tapping is done on butt plug 8 which is backed up by handle 2. It is therefore essential that the butt end of the grip have a tough, wear-resistant surface. However, since the butt end of the plug is often used in tapping materials less durable than brick, it is essential that the plug be sufficiently soft so as not to damage the surface being tapped.

Figure 3:
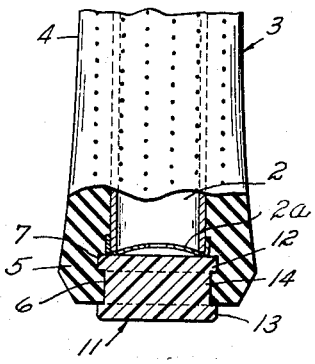
Fig. 3 is a fragmentary cross section of a second embodiment of this invention.

Referring now to the embodiment of Fig. 3, it is seen that butt plug 11 is provided with two radially extending annular abutments 12 and 13. As in the embodiment shown in Fig. 2, cylindrical body portion 14 engages the side walls of hole 6 formed in butt portion 5 of grip 3 and abutment 12 engages the side walls of groove 7 adjacent the end of handle 2. However, in this embodiment, an additional radially extending abutment 13 is provided so that the plug is symmetrical and can be reversed in position within grip portion 5 so as to present two usable surfaces on each butt plug.

It is therefore seen that the previously described butt plug protects the flexible grip of the hammer from damage while, at the same time, presenting an additional work surface for tapping bricks or highly finished surfaces. The plug of the instant invention is effectively retained in position and yet is easily removable to permit replacement or reversal.

As variations could be made in the above construction and different embodiments of this invention could be made by one skilled in the art, such variations and embodiments are intended to be included within the scope of this invention.

I claim:

1. In a hammer or the like, a handle, a resilient grip disposed about the butt end of said handle and extending therebeyond, said resilient grip having an axial opening formed in the extending portion, an annular groove in the side walls of the opening, said groove being adjacent the butt end of said handle and spaced from the end of the grip, and a tough plastic plug removably disposed in the opening in said resilient grip and extending slightly beyond the end of said grip, said plug having a first portion corresponding to the dimensions of the opening and a flange portion corresponding to the dimensions of and fitting said annular groove.

2. In a hammer or the like, a handle, a resilient grip disposed about the butt end of said handle and extending therebeyond, said resilient grip having an axial opening formed in the extending portion, an annular groove in the side walls of the opening, said groove being adjacent the butt end of said handle and spaced from the end of the grip, and a tough plastic plug removably disposed in the opening in said resilient grip, said plug having a central portion corresponding to the dimensions of the opening and a pair of annular end flanges either of which is engageable with said annular groove, the flanges of said plug being axially spaced so that engagement of one flange with the side walls of the annular groove positions the other flange beyond the end of the grip.

References Cited in the file of this patent

UNITED STATES PATENTS

| | | |
|---|---|---|
| 1,383,452 | Dickinson | July 5, 1921 |
| 2,086,083 | Jeffress | July 6, 1937 |
| 2,603,260 | Floren | July 15, 1952 |
| 2,754,863 | Yearley | July 17, 1957 |

FOREIGN PATENTS

| | | |
|---|---|---|
| 733,391 | Great Britain | July 13, 1955 |